(12) United States Patent
Goutzoulis et al.

(10) Patent No.: US 10,447,409 B2
(45) Date of Patent: Oct. 15, 2019

(54) OPTICAL CHANNELIZER FOR W-BAND DETECTION

(71) Applicant: Northrop Grumman Systems Corporation, Falls Church, VA (US)

(72) Inventors: Anastasios P Goutzoulis, Annapolis, MD (US); Doyle T Nichols, Ellicott City, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 146 days.

(21) Appl. No.: 13/923,697

(22) Filed: Jun. 21, 2013

(65) Prior Publication Data

US 2014/0376921 A1    Dec. 25, 2014

(51) Int. Cl.
*H04B 10/90*    (2013.01)

(52) U.S. Cl.
CPC ....... *H04B 10/90* (2013.01); *H04B 2210/006* (2013.01)

(58) Field of Classification Search
CPC .......................... H04B 10/80; H04B 2210/006
USPC .......................................... 385/1; 250/339.11
See application file for complete search history.

(56) References Cited

U.S. PATENT DOCUMENTS

| | | | | |
|---|---|---|---|---|
| 4,453,802 A | * | 6/1984 | Bridges | H03D 9/00 250/227.24 |
| 4,537,502 A | * | 8/1985 | Miller | G01S 17/36 342/127 |
| 4,736,463 A | * | 4/1988 | Chavez | H01Q 3/34 342/367 |
| 5,082,364 A | * | 1/1992 | Russell | G01S 17/36 356/5.15 |
| 5,276,450 A | * | 1/1994 | Schwegman | 342/16 |
| 5,305,009 A | * | 4/1994 | Goutzoulis | H01Q 3/38 342/157 |

(Continued)

FOREIGN PATENT DOCUMENTS

| | | | |
|---|---|---|---|
| JP | 2003163634 A | * | 6/2003 |
| WO | WO-2005/064375 A1 | | 7/2005 |

OTHER PUBLICATIONS

Qiang, Z, "Optical add-drop filters based on photonic crystal ring resonators," Optics Express, V. 15, N. 4, Feb. 2007, p. 1823.*

(Continued)

*Primary Examiner* — Peter Radkowski
(74) *Attorney, Agent, or Firm* — Alston & Bird LLP (57) ABSTRACT

An optically-downconverting channelizer is disclosed for W-band detection. The channelizer includes an input waveguide configured to carry an inputted signal having a plurality of wavelengths including a desired wavelength and a plurality of ring resonators arranged in parallel and coupled at spaced apart locations along the input waveguide for receiving the inputted signal, wherein each of the plurality of ring resonators is configured to pass a selected wavelength signal to an output end. The channelizer further includes a control waveguide that carries a second signal having a wavelength that differs from the desired wavelength by a predetermined amount, and a plurality of detectors coupled to respective output ends of the ring resonators, the plurality of detectors configured to produce channelized RF output signals representative of desired RF bands.

10 Claims, 7 Drawing Sheets

(56) References Cited

U.S. PATENT DOCUMENTS

| | | | | |
|---|---|---|---|---|
| 5,374,935 A * | 12/1994 | Forrest | H01Q 3/2676 |
| | | | | 342/368 |
| 5,381,147 A * | 1/1995 | Birkmayer | G02F 7/00 |
| | | | | 341/137 |
| 5,400,162 A * | 3/1995 | Newberg | H01Q 3/2676 |
| | | | | 385/24 |
| 5,859,611 A * | 1/1999 | Lam | H01Q 3/22 |
| | | | | 342/368 |
| 6,052,495 A * | 4/2000 | Little et al. | 385/2 |
| 6,100,841 A * | 8/2000 | Toth | G01S 7/4021 |
| | | | | 342/149 |
| 6,115,162 A * | 9/2000 | Graves | H04B 10/60 |
| | | | | 398/1 |
| 6,124,827 A * | 9/2000 | Green | H01Q 3/22 |
| | | | | 342/157 |
| 6,195,187 B1 * | 2/2001 | Soref et al. | 398/9 |
| 6,204,947 B1 * | 3/2001 | Page | H01Q 3/2676 |
| | | | | 250/227.12 |
| 6,212,378 B1 * | 4/2001 | Wismer | 455/429 |
| 6,295,020 B1 * | 9/2001 | Koechlin | 342/175 |
| 6,407,846 B1 * | 6/2002 | Myers | G02F 2/00 |
| | | | | 359/239 |
| 6,426,721 B1 * | 7/2002 | Obara | H01Q 3/2676 |
| | | | | 342/372 |
| 6,498,582 B1 * | 12/2002 | Sweeney | G01S 7/4021 |
| | | | | 342/149 |
| 6,512,866 B1 | 1/2003 | Fan et al. | |
| 6,611,645 B2 | 8/2003 | Aleksoff | |
| 6,643,421 B1 * | 11/2003 | Chin et al. | 385/15 |
| 6,653,971 B1 * | 11/2003 | Guice | A01M 1/026 |
| | | | | 342/22 |
| 6,791,734 B2 * | 9/2004 | Izadpanah | H01Q 3/2676 |
| | | | | 330/276 |
| 6,807,343 B2 * | 10/2004 | Tulchinsky | H01Q 3/2676 |
| | | | | 385/140 |
| 6,853,328 B1 * | 2/2005 | Guice | A01M 1/026 |
| | | | | 342/22 |
| 6,876,796 B2 * | 4/2005 | Garito et al. | 385/50 |
| 6,901,224 B1 | 5/2005 | Davis | |
| 6,940,878 B2 | 9/2005 | Orenstein et al. | |
| 6,941,036 B2 | 9/2005 | Lucero | |
| 6,963,442 B2 * | 11/2005 | Yap | G02F 2/002 |
| | | | | 359/326 |
| 7,006,744 B2 | 2/2006 | Carniel et al. | |
| 7,065,276 B2 * | 6/2006 | Scheuer et al. | 385/50 |
| 7,084,811 B1 * | 8/2006 | Yap | H01Q 3/2676 |
| | | | | 342/373 |
| 7,110,632 B2 | 9/2006 | Abeles | |
| 7,120,333 B2 * | 10/2006 | Eder et al. | 385/27 |
| 7,123,800 B2 | 10/2006 | Kaplan | |
| 7,149,381 B2 | 12/2006 | Margalit et al. | |
| 7,174,064 B2 * | 2/2007 | Sayyah et al. | 385/15 |
| 7,269,354 B1 * | 9/2007 | Silverman | H04B 10/2575 |
| | | | | 398/115 |
| 7,302,185 B2 * | 11/2007 | Wood et al. | 398/115 |
| 7,363,020 B2 * | 4/2008 | Kanaya | H03D 9/0633 |
| | | | | 455/323 |
| 7,421,168 B1 * | 9/2008 | Goutzoulis | G02B 6/12007 |
| | | | | 359/337.2 |
| 7,446,696 B2 * | 11/2008 | Kondo | G01S 7/35 |
| | | | | 180/167 |
| 7,564,387 B1 * | 7/2009 | Vawter | G02F 7/00 |
| | | | | 341/137 |
| 7,633,977 B2 * | 12/2009 | Sanders | H01S 3/0057 |
| | | | | 372/25 |
| 7,650,080 B2 * | 1/2010 | Yap | G02F 2/02 |
| | | | | 398/161 |
| 7,777,630 B2 * | 8/2010 | Tuttle | H04B 5/00 |
| | | | | 340/572.1 |
| 7,801,189 B2 * | 9/2010 | Maleki et al. | 372/26 |
| 7,801,447 B1 * | 9/2010 | Williams | G01S 3/22 |
| | | | | 398/116 |
| 7,835,650 B2 * | 11/2010 | Li | H04B 10/2575 |
| | | | | 398/202 |
| 7,974,534 B2 * | 7/2011 | Weiner | H04B 1/40 |
| | | | | 398/149 |
| 8,032,027 B2 * | 10/2011 | Popovic | 398/82 |
| 8,098,185 B2 * | 1/2012 | Ridgway | G01S 7/03 |
| | | | | 342/175 |
| 8,174,758 B2 * | 5/2012 | Muro | H01S 3/0014 |
| | | | | 359/337.1 |
| 8,228,226 B2 * | 7/2012 | Chan | H04L 1/20 |
| | | | | 342/132 |
| 8,265,488 B2 * | 9/2012 | Davies | H04B 10/2575 |
| | | | | 398/128 |
| 8,400,349 B1 * | 3/2013 | Dubbert | G01S 7/32 |
| | | | | 342/113 |
| 8,400,355 B1 * | 3/2013 | Gaeta | H01Q 3/2682 |
| | | | | 342/368 |
| 8,494,317 B2 * | 7/2013 | Bolla et al. | 385/32 |
| 8,494,318 B2 * | 7/2013 | Bolla et al. | 385/32 |
| 8,515,285 B2 * | 8/2013 | DeSalvo et al. | 398/140 |
| 8,620,158 B2 * | 12/2013 | Peach et al. | 398/66 |
| 9,042,295 B1 * | 5/2015 | Balter et al. | 370/317 |
| 9,335,406 B2 * | 5/2016 | Lohr | G01S 13/86 |
| 2002/0131128 A1 * | 9/2002 | Myers | H04B 10/07957 |
| | | | | 398/158 |
| 2003/0035162 A1 * | 2/2003 | Myers | H04B 10/505 |
| | | | | 398/5 |
| 2003/0128980 A1 * | 7/2003 | Abeles | 398/48 |
| 2004/0090365 A1 * | 5/2004 | Newberg | H01Q 3/22 |
| | | | | 342/368 |
| 2004/0228638 A1 * | 11/2004 | Sayyah et al. | 398/183 |
| 2005/0123306 A1 * | 6/2005 | Ilchenko et al. | 398/161 |
| 2005/0196103 A1 * | 9/2005 | Kaplan | 385/50 |
| 2005/0213075 A1 * | 9/2005 | Cooke | G01S 7/484 |
| | | | | 356/28 |
| 2006/0008272 A1 * | 1/2006 | Abeles | 398/48 |
| 2006/0040637 A1 * | 2/2006 | Kanaya | H03D 9/0633 |
| | | | | 455/331 |
| 2006/0159392 A1 * | 7/2006 | Popovic | 385/27 |
| 2006/0197959 A1 | 9/2006 | Barwicz et al. | |
| 2006/0228120 A9 | 10/2006 | McCallion et al. | |
| 2006/0228120 A1 * | 10/2006 | Wood et al. | 398/85 |
| 2006/0245693 A1 | 11/2006 | Barwicz et al. | |
| 2006/0273255 A1 * | 12/2006 | Volkov | G01S 7/024 |
| | | | | 250/336.1 |
| 2007/0297716 A1 * | 12/2007 | Helkey | H04B 1/18 |
| | | | | 385/16 |
| 2008/0013150 A1 * | 1/2008 | Li | H04B 10/2575 |
| | | | | 359/238 |
| 2008/0117099 A1 * | 5/2008 | Walter | G01S 7/032 |
| | | | | 342/25 R |
| 2008/0212974 A1 * | 9/2008 | Davies | H04B 10/2575 |
| | | | | 398/140 |
| 2009/0027168 A1 * | 1/2009 | Tuttle | H04B 5/00 |
| | | | | 340/10.2 |
| 2009/0135860 A1 * | 5/2009 | Maleki et al. | 372/20 |
| 2009/0184860 A1 * | 7/2009 | Chan | H04L 1/20 |
| | | | | 342/21 |
| 2009/0213455 A1 * | 8/2009 | Muro | H01S 3/0014 |
| | | | | 359/341.3 |
| 2010/0189441 A1 * | 7/2010 | Bolla et al. | 398/79 |
| 2011/0150485 A1 * | 6/2011 | Seidel | G02F 2/002 |
| | | | | 398/115 |
| 2013/0028610 A1 * | 1/2013 | DeSalvo et al. | 398/139 |
| 2013/0188952 A1 * | 7/2013 | Peach et al. | 398/65 |
| 2014/0022119 A1 * | 1/2014 | Lohr | G01S 13/86 |
| | | | | 342/25 R |

OTHER PUBLICATIONS

Jebril, A., "Perspectives of W-Band for Space Communications," Aerospace Conference, 2007 IEEE, p. 1-12.*

Guzzon et al., NPL—Spurious-Free Dynamic Range in Photonic Integrated Circuit Filters With Semiconductor Optical Amplifiers, Quantum Electronics, IEEE Journal of, vol. 48, No. 2, pp. 269-278, Feb. 2012.*

(56) References Cited

OTHER PUBLICATIONS

Tu et al., NPL—Silicon RF-Photonic Filter and Down-Converter, Journal of Lightwave Technology, vol. 28, No. 20, pp. 3019-3028, Oct. 2010.*
Clark et al., "Photonic Downconversion and Linearization of an X-Band Fiber Optic Link Using Optical ;I/Q Demodulation," in Conference on Lasers and Electro-Optics/Quantum Electronics and Laser Science Conference and Photonic Applications Systems Technologies, OSA Technical Digest Series (CD) (Optical Society of America, 2007), paper CTuAA2.*
Clark et al., "A Phase-Modulation I/Q-Demodulation Microwave-to-Digital Photonic Link," in IEEE Transactions on Microwave Theory and Techniques, vol. 58, No. 11, pp. 3039-3058, Nov. 2010.*
McKenna et al., "Wideband photonic compressive sampling analog-to-digital converter for RF spectrum estimation," 2013 Optical Fiber Communication Conference and Exposition and the National Fiber Optic Engineers Conference (OFC/NFOEC), Anaheim, CA, Mar. 2013, pp. 1-3.*
Pang et al., "100 Gbit/s hybrid optical fiber-wireless link in the W-band (75-110 GHz)," Opt. Express 19, 24944-24949 (2011).*
Strutz et al., "An 8-18-GHz all-optical microwave downconverter with channelization," in IEEE Transactions on Microwave Theory and Techniques, vol. 49, No. 10, pp. 1992-1995, Oct. 2001.*
Takahashi et al., "Supporting Fast and Clear Video," IEEE Microwave Magazine, p. 54, 2012.*

* cited by examiner

OPTICAL CHANNELIZER FOR W-BAND DETECTION

TECHNOLOGICAL FIELD

Example embodiments of the present invention relate generally to radio wave detection and, more particularly, to an optical channelizer for optically downconverting input signals for W-band detection.

BACKGROUND

Recent advances in the area of integrated optical technology have resulted in improvements to integrated optical channelizer (IOC) technology. At the same time, the millimeter wave (mmW) spectrum, and in particular, the W-band (75-110 GHz) has become increasingly relevant as the latest "new" threat band.

BRIEF SUMMARY

Because of the growing potential for threats detectable in W-band spectrum, embodiments of the present invention address what is likely to develop into an important need to detect signals in the W-band spectrum. Accordingly, example embodiments of the present invention describe an optically-downconverting optical channelizer for W-band detection with up to a 100% probability of intercept. The focus on W-band notwithstanding, the optically-downconverting optical channelizer has an inherent bandwidth (BW) that exceeds 4,000 GHz. Although any of its filters can be tuned anywhere in this 4,000 GHz band, example embodiments described below are used for threat detection in the millimeter wave (mmW) spectrum, and specifically in the W-band (75-110 GHz).

In a first example embodiment, a signal channelizer is provided that includes an input waveguide configured to carry an inputted signal having a plurality of wavelengths including a desired wavelength, and a plurality of ring resonators arranged in parallel and coupled at spaced apart locations along the input waveguide for receiving the inputted signal, wherein each of the plurality of ring resonators is configured to pass a different selected wavelength signal to a respective output end. The signal channelizer further includes a control waveguide that carries a second signal having a wavelength that differs from the desired wavelength by a predetermined amount, and a plurality of detectors coupled to the respective output ends of the ring resonators, the plurality of detectors configured to produce channelized radio frequency (RF) output signals representative of desired RF bands.

In some embodiments, each of the plurality of detectors is coupled to the control waveguide and is configured to produce a channelized RF output signal by heterodyning the second signal with the selected wavelength signal from a respective output end of one of the ring resonators.

In other embodiments, the signal channelizer includes one or more additional control waveguides that carry signals having wavelengths that differ from the desired wavelength by predetermined amounts. In such embodiments, each of the plurality of detectors is coupled to one of the control waveguides and is configured to produce a channelized RF output signal by heterodyning the signal from the control waveguide to which it is coupled with the selected wavelength signal from a respective output end of one of the ring resonators.

In some embodiments, the desired wavelength must be such that allows operation at W-band. In such embodiments, the predetermined amount may be 75 GHz. In other embodiments, at least one of the ring resonators includes a plurality of rings. In another embodiment, the ring resonators comprise micro ring resonators. In yet another embodiment, the signal channelizer includes an optical modulator configured to create the inputted signal for the input waveguide by modulating an inputted optical carrier signal with a received signal. In a further embodiment, the signal channelizer is contained on a single chip.

In another example embodiment, a method for signal channelizing is provided. The method includes receiving, by an input waveguide, a signal having a plurality of wavelengths including a desired wavelength, and filtering the signal through a plurality of ring resonators, arranged in parallel and coupled at spaced apart locations along the input waveguide for receiving the signal, to pass selected wavelength signals to a respective output end. The method further includes receiving, by a control waveguide, a second signal having a wavelength that differs from the desired wavelength by a predetermined amount, and producing, by a plurality of detectors coupled to the respective output ends of the ring resonators, channelized RF output signals representative of desired RF bands.

In some embodiments, each of the plurality of detectors is coupled to the control waveguide. In such embodiments, producing channelized RF output signals representative of desired RF bands includes heterodyning, by each of the plurality of detectors, the second signal with a selected wavelength signal from a respective output end of one of the ring resonators.

In other embodiments, the method includes receiving, by one or more additional control waveguides, one or more signals having wavelengths that differ from the desired wavelength by predetermined amounts. In such embodiments, each of the plurality of detectors is coupled to one of the control waveguides, and producing channelized RF output signals representative of desired RF bands includes heterodyning, by each of the plurality of detectors, the signal from the control waveguide to which it is coupled with the selected wavelength signal from a respective output end of one of the ring resonators.

In some embodiments, the desired wavelength must be such that allows operation at W-band. In such embodiments, the predetermined amount may be 75 GHz. In other embodiments, at least one of the ring resonators includes a plurality of rings. In another embodiment, the ring resonators comprise micro ring resonators. In yet another embodiment, the method includes creating the signal for the input waveguide by modulating, by an optical modulator, an inputted optical carrier signal with a received signal. In a further embodiment, receiving the signal from the input waveguide, filtering the signal, receiving the second signal, and producing channelized RF output signals occur on a single chip.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In conjunction with the attached Figures, a signal channelizer 10 is herein described having an input waveguide 14 configured to carry an inputted signal having a plurality of wavelengths that includes at least one desired center optical wavelength. The input waveguide 14 is connected to an integrated Optical Modulator (IOM) 42 which has an input port 22 for receiving an unmodulated continuous wave (CW) optical signal 40, an input RF port 60 for receiving the wideband RF signal 58 to be channelized, and which is configured to create the inputted signal transmitted using the input waveguide by modulating the optical signal 40 with the wideband RF signal 58. After modulation of the CW optical signal, the wideband RF signal appears as a plurality of optical wavelengths 20, as shown in FIG. 1.

A plurality of ring resonators 12 for wavelength selection are arranged in parallel and coupled at spaced apart locations along the input waveguide 14 for receiving the inputted signal from the input waveguide 14. In this regard, coupling a ring resonator 12 to the input waveguide 14 may comprise moving the ring resonator close enough to the waveguide that, due to the wave property of light, some fraction of the light from the waveguide will enter the ring resonator. Each of the plurality of ring resonators 12 is then configured to pass a selected wavelength signal to its respective output end 56, which is opposite the end of the ring resonator that receives the selected wavelength signal. An output or control waveguide 16 carries the unmodulated CW optical carrier, which has been stripped from all modulation after passing through a very narrow optical ring resonator filter 12X. The output waveguide 16 passes or communicates a desired portion of the CW optical signal to the output end 56 of each ring resonator 12. In some embodiments, an output waveguide 16 is tapped with couplers 46 for providing the desired portion of the CW optical carrier to feed the output end 56 of the ring resonators 12 with the desired CW optical carrier. An optical detector 32 associated with the output end 56 of each ring resonator 12 produces the desired output RF filtered (or channelized) signal 34. The result is that the ring resonators 12 provide desired wavelength filtering of the inputted signal and, after mixing with the optical carrier, the detector or detectors 32 channelize the output signal 34 into desired RF components.

The IOC 10 is based on photonic micro-ring resonators (MRRs) 12, thus the operation of MRRs may be briefly summarized as follows. Photonic MRRs 12 are versatile wavelength-selective devices that can be used to synthesize a wide range of photonic filtering functions.

Figure 1:
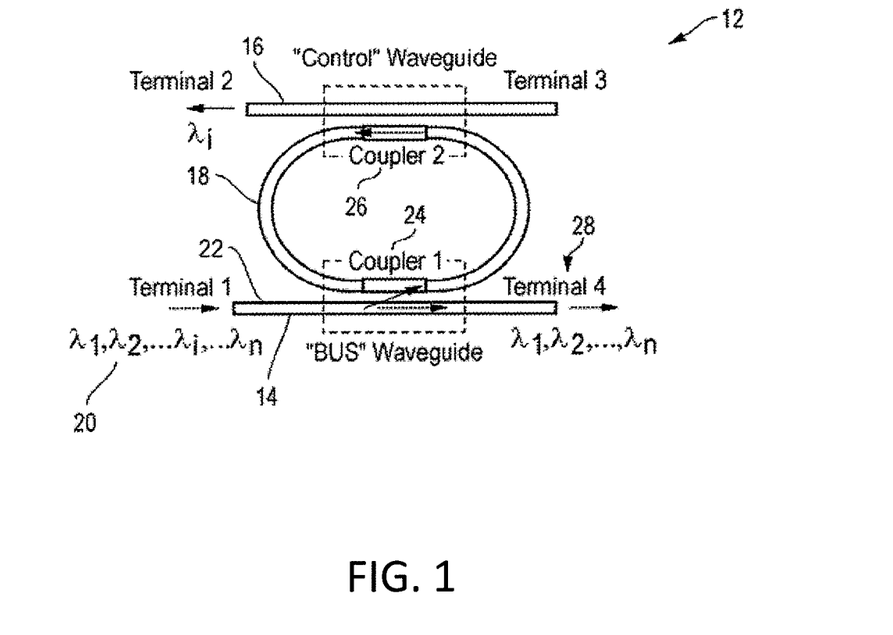
FIG. 1 illustrates a schematic diagram of a micro-ring resonator (MRR), in accordance with some example embodiments.

As shown in FIG. 1, a MRR 12 consists of two parallel optical waveguides 14, 16 with a ring waveguide 18 in between them. In a MRR 12, multiple optical wavelength signals 20 enter at the input port 22 (Terminal 1) of the "bus" waveguide 14. Of those wavelengths, one will be coupled into the ring 18 via Coupler 1 24. Next, the optical signal in the ring 18 will be coupled into the "control" waveguide 16 via Coupler 2 26.

The degree to which coupling is achieved depends on the resonant condition: $n_{eff}L = m\lambda$, where $n_{eff}$ is the effective refractive index of the bending waveguide, L is the circumference of the ring 18, $\lambda$ is the optical wavelength, and m is an integer. When optical wavelength $\lambda_i$ satisfies the above condition, it will be coupled 100% from the bus waveguide 14 to the control waveguide 16, while all other wavelengths that do not satisfy the above condition will continue into the bus waveguide 14 with virtually zero attenuation and exit at output Terminal 4 28.

Figure 2:
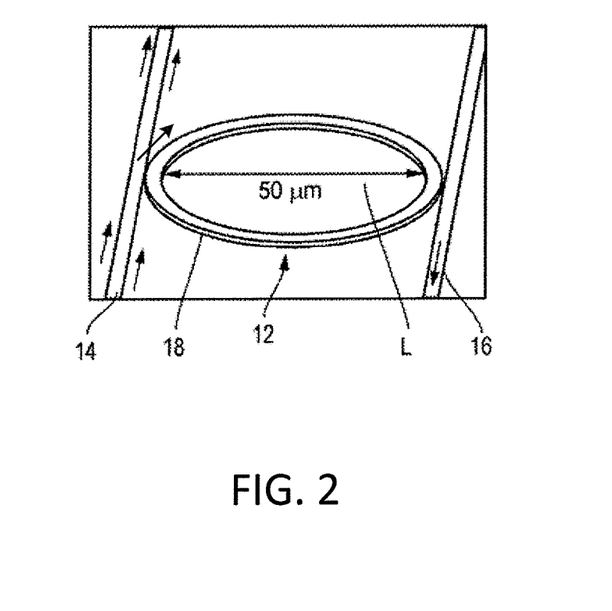
FIG. 2 illustrates another diagram of a MRR, in accordance with some example embodiments.

This filtering operation is also explained in FIG. 2 (note the extremely small dimension of the ring, on the order of 50 microns). This small size manifests the fact that the size of a filter scales with the carrier wavelength and optical components are orders of magnitude smaller than their RF equivalents. The filtration of the signal occurs due to the size of each resonator 12 (or, in some embodiments, by manipulation of other physical characteristics that may be known to alter resonance). In particular, as light passes through the ring resonator 12, the selected wavelength signal undergoes constructive interference each time it passes a given point on the circumference of the ring resonator 12. Other wavelengths, however, will not be at resonance within the ring resonator 12, and therefore will not be efficiently coupled to from the input 14 to the output end 16.

Figure 3:
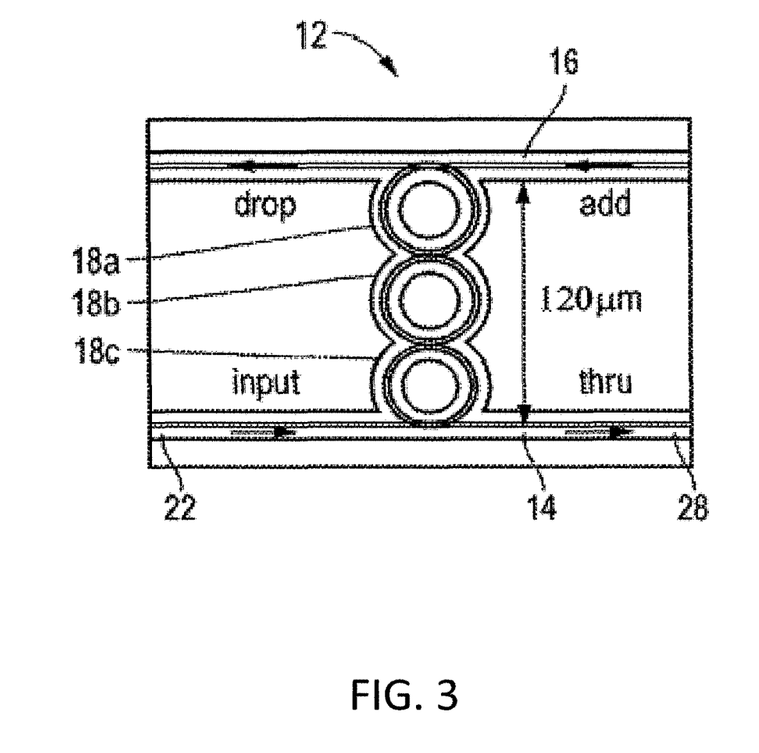
FIG. 3 illustrates a MMR having 3 rings, in accordance with some example embodiments.
Figure 4:
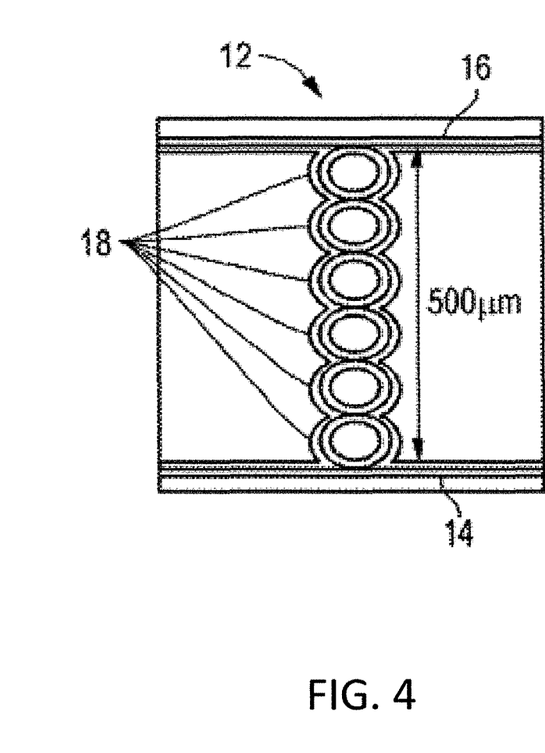
FIG. 4 illustrates a MMR having 6 rings, in accordance with some example embodiments.

To further increase the "fitness" or coupling selectivity of the ring, two or more rings 18a-18c can be used, as shown in FIGS. 3 (having three rings) and 4 (having six rings).

In some embodiments, MRRs 12 can be made in various substrates using conventional optoelectronic foundries, e.g., SiO$_2$ (Silicon Dioxide), InP (Indium Phosphide), and various forms of glass-like materials. Such devices have been made as small as a few μm in size and are thus ideal for large scale integration.

The present IOC 10 may combine photonic up-conversion, combined on-chip photonic MMR filtering, on-chip square law detection, and downconversion to create a very powerful RF channelizer. Further, the IOC 10 of an example embodiment of the present invention may advantageously employ one or more of the following operations: (1) up-conversion of the RF band of interest by modulating an optical carrier with the received RF signal; (2) multi-channel filtering in the optical domain (via multiple MRRs) with GHz-type resolution; and (3) downconversion of the filtered MRR outputs via mixing with the optical carrier and subsequent square-law detection.

Figure 5:
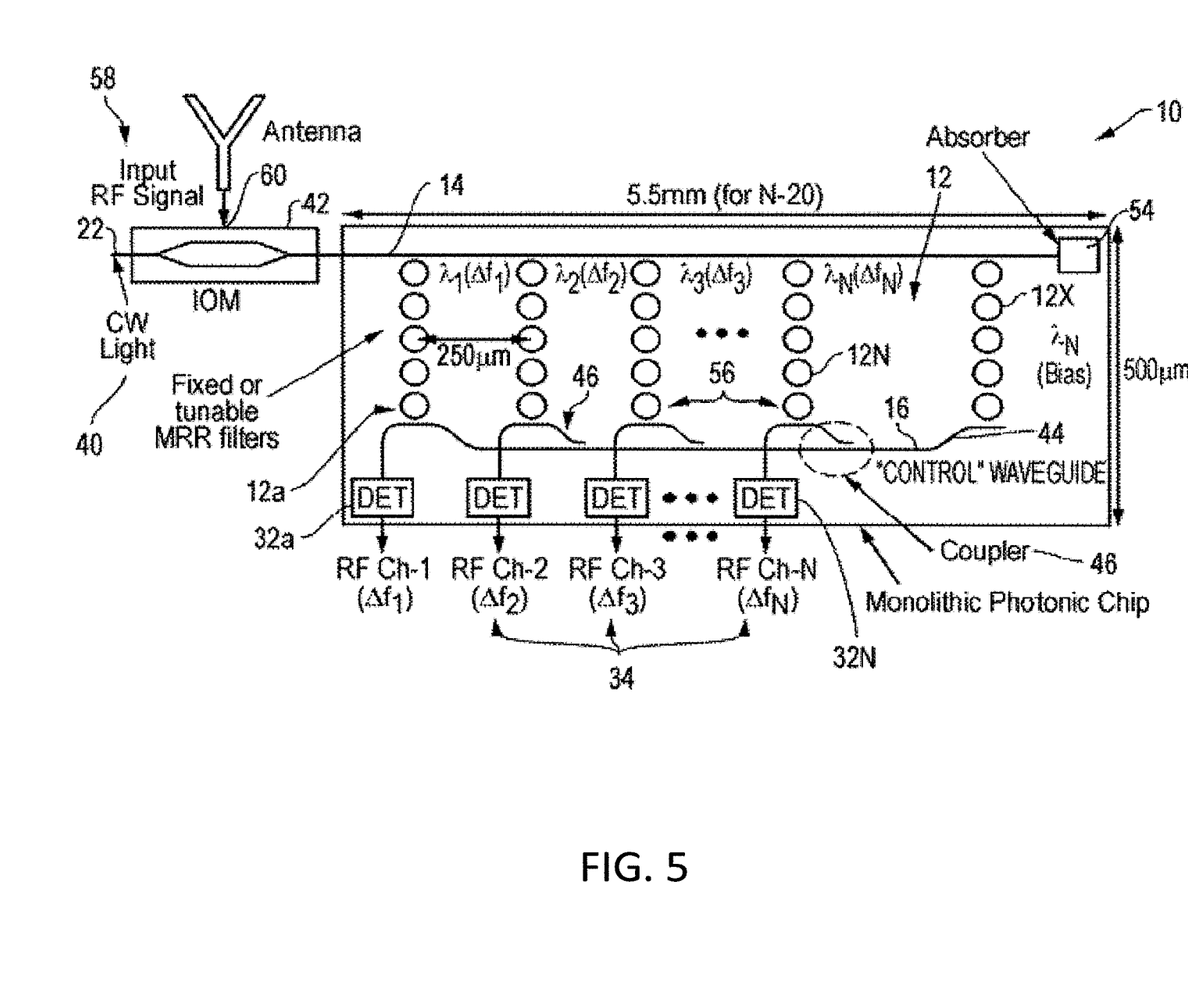
FIG. 5 illustrates a schematic diagram of an integrated optical channelizer.

FIG. 5 shows an example single-chip architecture embodiment in which the IOC described above is contained on a single chip. With the aid of FIG. 5, one can understand the present IOC 10 via its three key operations as follows.

Optical up-conversion: The input RF signal 58 to be channelized modulates an optical carrier 40 using an external Integrated Optical Modulator 42 (IOM). As described below, an on-chip heterogeneously-integrated IOM 42 is also possible.

Photonic filtering: The RF-modulated optical carrier 40 enters the "bus" waveguide 14 of an integrated optical channelizer structure 10. As it propagates it encounters N different multi-order MRRs 12A-12N that are designed to "sharply" band-pass-filter a narrow band of light ($\Delta f_i$) over the full RF modulation $F_{full}$ and are connected in a parallel arrangement along the bus waveguide 14. The center frequency ($f_c$) of these filters increases by $\Delta f$, such that $N \times \Delta f = F_{full}$. For example, to cover the 2-18 GHz band with 20 MRR filters each with $\Delta f = 0.8$ GHz, the MRR-to-MRR $f_c$ must increase by 0.8 GHz.

Carrier mixing and detection: In FIG. 5, the last MRR filter 12X before the terminus (absorber) 54 of the bus or input waveguide 14 deals exclusively with the optical carrier or "bias" wavelength $\lambda_c$; specifically, it separates it from any other unfiltered signals and guides it into the control waveguide 16. The control waveguide 16 of FIG. 5 acts as a "bias" bus 44 that one "taps" with couplers 46 in order to feed the output from the output end 56 of each MRR filter 12A-12N to mix the filtered sideband with the carrier 40.

This "feeding" is accomplished using on-chip variable ratio optical couplers 46. The "variable" ratio is needed in order to feed the output of each MRR 12A-12N with approximately the same amount of carrier optical power. Thus, as the control waveguide 16 goes from right to left in FIG. 5, the ratio of each coupler 46 increases because less and less light is available. In some embodiments, the same operation could be achieved by "equally" splitting the control waveguide output into N channels, and then directing each channel to a different MRR. However, the 1-to-N splitter approach increases the complexity and size of the IOC. The N-output waveguides which carry both the N-channels of the filtered modulation and N-equal power carrier portions end up in an on-chip integrated square law detector 32A-32N (DET, in FIG. 5). The detectors can be either heterogeneously integrated onto the chip or they can be grown/deposited directly onto the chip. In another embodiment, the detectors can be external to the chip.

As FIG. 5 shows, the dimensions of the IOC 10 are extremely small. Since typical resonators, made in, for example, silicon or silicon oxynitride, are separated by about 250 microns and are about 50 microns in diameter, a 20 channel 5th order MRR IOC will occupy ~5.5 mm×0.5 mm (again, this is due to the fact that the size of a filter scales with the carrier wavelength). Thus, the IOC 10 of FIG. 5 could accomplish functions that commercial off-the-shelf (COTS) RF channelizers require more than 10 square inches to accomplish.

IOC 10, disclosed above, is in essence a high resolution filter bank and thus can be used as a cueing receiver, a radar warning receiver, or for any number of additional purposes. The IOC 10 occupies a few square millimeters; it can have 10s of fixed and/or tunable channels with various bandwidths (0.5-25 GHz). Since any of its filters can be tuned anywhere in this 4,000 GHz band, it can be used for threat detection in the millimeter wave (mmW) spectrum, and specifically in the W-band (75-110 GHz). This is very important because there is simply no other miniature channelizer technology with a 100% probability of intercept that can cover the W-band which is considered the latest "new" threat band.

However, there are two peripheral component issues that prevent the IOC architecture of FIG. 5 from being truly practical at the W-band: (1) RF down converters needed for the conversion of the W-band to, for example, a Ka baseband, and (2) COTS photodiodes (DET) that can operate efficiently with 75-110 GHz signal input. The former deficiency relates to the fact that the DET outputs of the IOC in FIG. 5 are physically W-band signals. Therefore, in order to be digitized and processed with existing digital signal processor (DSP) technology, the W-band outputs need to be converted first to a lower RF band and subsequently to a baseband. However, parallel, multi-channel downconversion from the W-band to, for example, the Ka band (40 GHz) is historically a very difficult task requiring mmW mixers, filters, bulk waveguides, mmW local oscillator (LO) generators, and low noise amplifiers (LNAs), among other components. The second problem is that there currently exists a lack of COTS efficient, low cost, mmW photodiodes. In addition, the small area associated with mmW photodiodes restricts the maximum incident optical power which limits the gain and thus the signal-to-noise ratio (SNR) of the IOC.

Accordingly, a new optical downconverting IOC architecture is needed to solve both of these problems. The optically-downconverting optical channelizer described below provides a global solution in which a band within the 4,000 GHz IOC BW can be downconverted and detected using truly COTS-based optical components.

Figure 6:
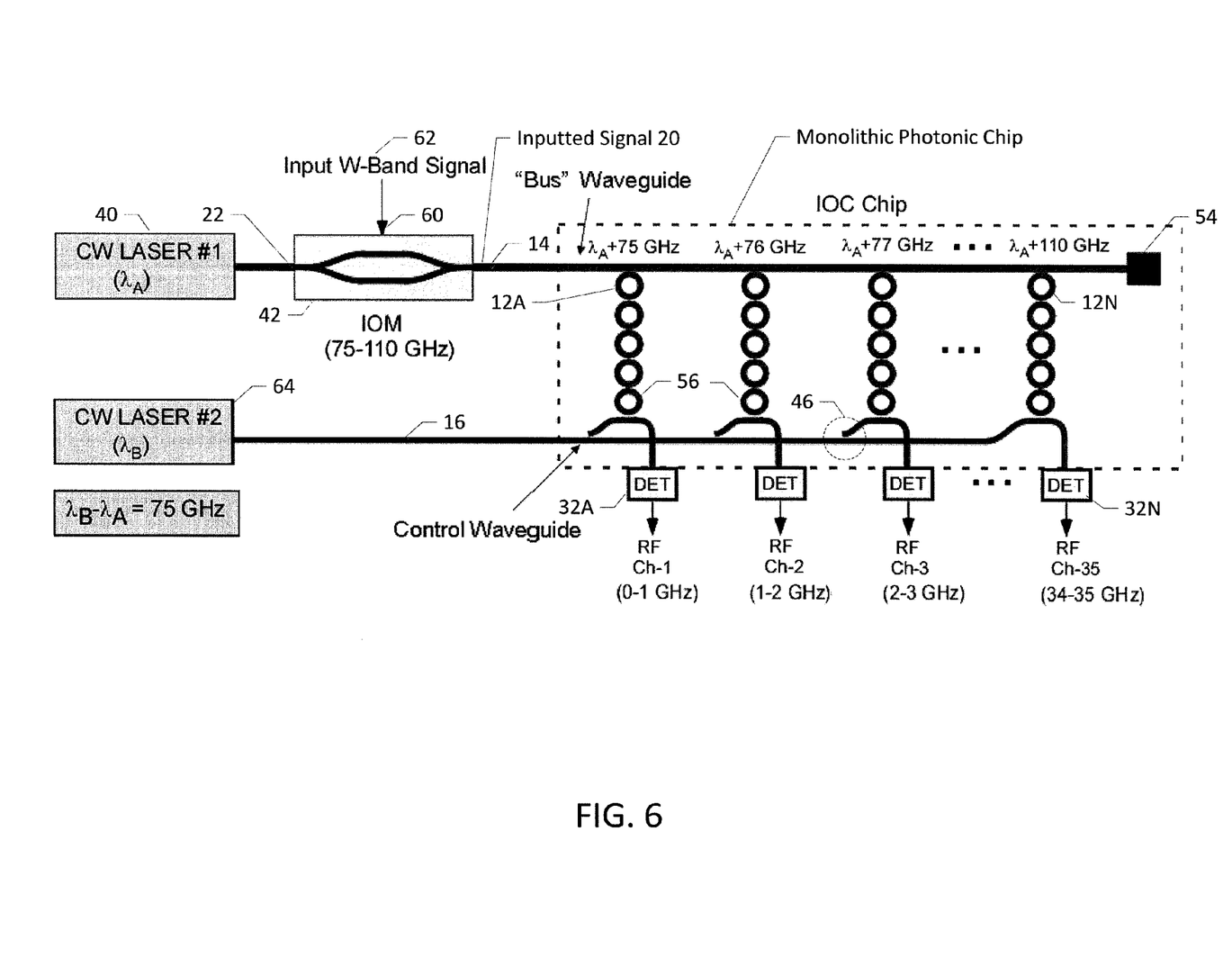
FIG. 6 illustrates a schematic diagram of an example optical channelizer using a separate control waveguide, in accordance with some example embodiments.

FIG. 6 illustrates a schematic diagram of an example optical channelizer that addresses these issues and accordingly is configured for detection of a W-band input signal 62. The example IOC shown in FIG. 6 is similar in certain respects to that described in FIG. 5 above. For instance, the IOC described in FIG. 6 also has an input waveguide 14 and a plurality of ring resonators 12A to 12N for wavelength selection. In this regard, the ring resonators are arranged in parallel and coupled at spaced apart locations along the input waveguide 14 for receiving the inputted signal 20 from the IOM 42 via the input waveguide 14. Each of the plurality of ring resonators 12 is configured to pass a selected wavelength signal to its respective output end 56. Similarly, a control waveguide 16 is tapped with couplers 46 to feed the output ends 56 of the ring resonators 12 with the signal carried by the control waveguide 16. Finally, optical detectors 32A to 32N, associated with the output ends 56 of each ring resonator 12, produce the desired output RF filtered (or channelized) signal 34. The result is that the ring resonators 12 provide desired wavelength filtering of the inputted signal 20 and, after mixing with the optical carrier, the detector or detectors 32 channelize the output signal into desired RF components.

However, the IOC shown in FIG. 6 has several major differences from the architecture shown in FIG. 5 including, but not limited to: (1) the control waveguide 16 is separated from the bus waveguide; (2) the control waveguide 16 is injected with continuous wave (CW) laser light 64 at wavelength $\lambda_B$, which may differ from the wavelength ($\lambda_A$) used for the signal detection and the bus waveguide by a predetermined amount (which may be based on the number of filters included in the IOC and the RF bandwidth for which detection is required); and (3) the photodiodes used at the IOC output channels need not operate at the 110 GHz that the original IOC would require.

With respect to differences (1) and (2), the control waveguide 16 is configured to carry a second signal having a wavelength that differs from the desired wavelength by the predetermined amount. By using a different wavelength of light in the control waveguide, each square law detector DET 32, upon detection of the two different wavelength light beams, will heterodyne the signals to effectively generate their RF difference frequency at its output 34, which, as described in greater detail below, will comprise RF output signals representative of desired RF bands. With respect to difference (3), the photodiodes need not operate as high as the 110 GHz upper threshold of the W-band, because the heterodyning operation downconverts the RF output by the difference between wavelengths $\lambda_A$ and $\lambda_B$, which may be freely chosen.

Figure 7:
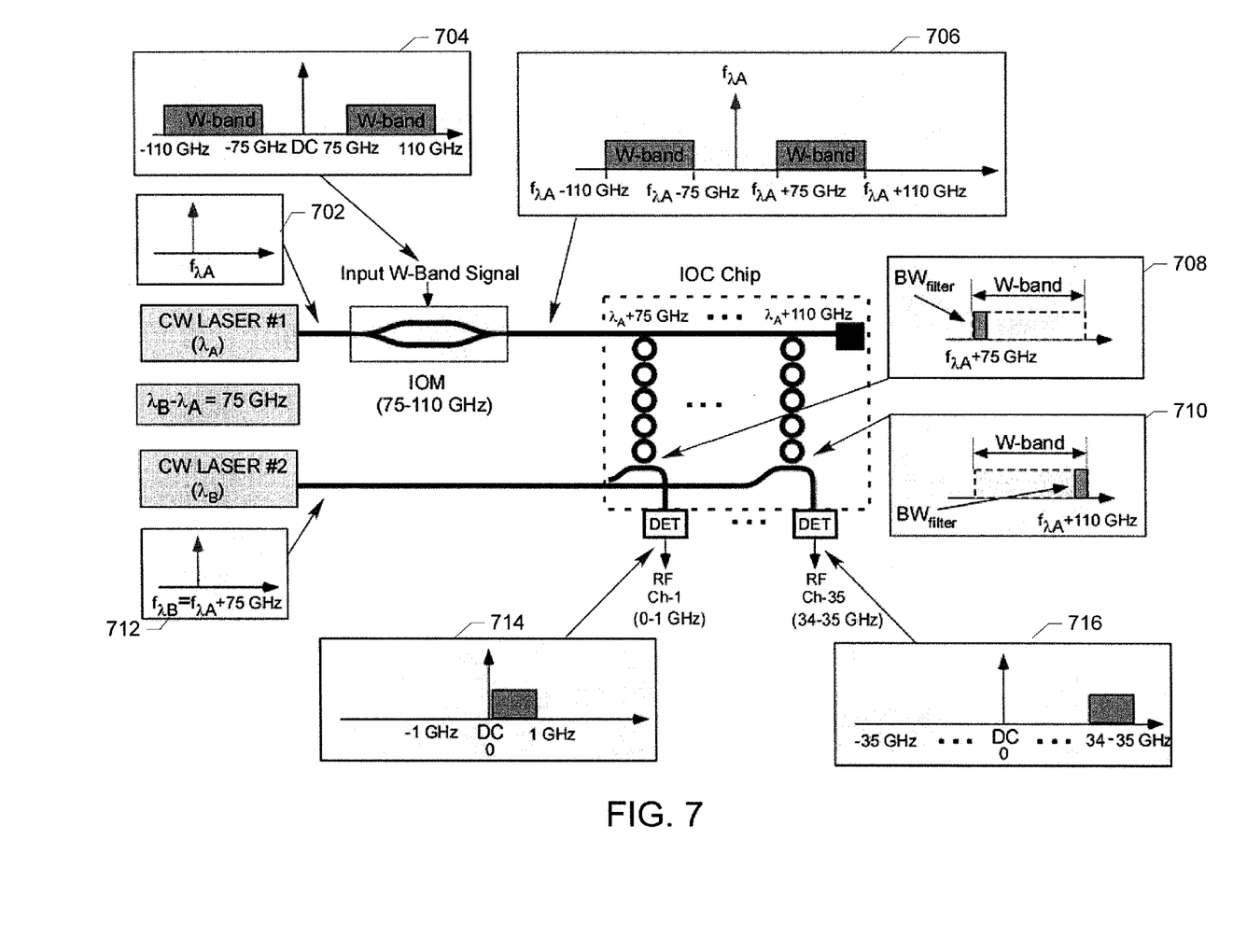
FIG. 7 is a graphical representation of example spectra at several key junctions of downconversion for two optical channelizer channels, in accordance with some example embodiments.

FIG. 7 shows a graphical illustration including example spectra at several key junctions of the downconverting IOC architecture for the first (75 GHz) and last (110 GHz) IOC channels. The CW laser light 702 at wavelength $\lambda_A$ is double-sideband (DSB) modulated by the input W-band (75-110 GHz) signal 704 via the integrated optical modulator (IOM). The spectrum 706 at the IOM's output therefore includes some DC light at $\lambda_A$ as well as 2 sidebands which cover the $f_{\lambda A}$-75 GHz to $f_{\lambda A}$-110 GHz (lower sideband) and $f_{\lambda A}$+75 GHz to $f_{\lambda A}$+110 GHz (upper sideband). The MRR filters of the IOC are single sideband (SSB) and, in this example, have a 1 GHz RF BW each (e.g., 35 such filters are needed to cover the 75-110 GHz band with 1 GHz resolution).

For ease of explanation, FIG. 7 only shows example spectra of the 1st and last (35th) IOC channels. The 1st IOC channel covers the 75-76 GHz band (shown as $\lambda_A$+75 GHz in FIGS. 6 and 7), whereas the 35th channel covers the 109-110 GHz band (shown as $\lambda_A$+110 GHz in FIGS. 6 and 7). The MRR filters block the lower sideband as well as the DC light and pass only a portion of the upper sideband to an output end of the MRR. Thus, as shown in spectrum 708, at the bottom of the 1st MRR filter light exists only in the $\lambda_A$+75 GHz to $\lambda_A$+76 GHz band (denoted as $\lambda_A$+75 GHz in FIG. 7) whereas at the bottom of the 35th filter, shown by spectrum 710, light exists only in the $\lambda_A$+109 GHz to $\lambda_A$+110 GHz band (denoted as $\lambda_A$+110 GHz in FIG. 7).

Next the filtered light is mixed with the CW laser light 712 at wavelength $\lambda_B$ and is detected by each DET to produce channelized RF output signals representative of desired RF bands. In this regard, the square law detection process heterodynes the second signal from CW laser light 712 with the filtered light (the wavelength signal from the output end of the ring resonator), which results in the generation of both the sum and the difference of the filtered light and the CW light at $\lambda_B$. However, the sum at $(f_{\lambda B}+f_{\lambda A}+k$ GHz) is outside the DET BW and thus it produces no output. Given the fact that $f_{\lambda B}-f_{\lambda A}=75$ GHz, the difference term $(-f_{\lambda B}+f_{\lambda A}+k$ GHz) becomes $(-f_{\lambda B}+f_{\lambda A}+k$ GHz)=$(-f_{\lambda A}-75$ GHz+$f_{\lambda A}$+k GHz)=k−75 GHz, which is the desired downconverted RF output. For example, for the first channel with k=75 to 76 GHz the resulting RF output is 0-1 GHz (spectrum 714), whereas for the 35th channel with k=109-110 GHz the resulting RF output is 34-35 GHz (spectrum 716). Accordingly, by downconverting W-band signals into the Ka band, example embodiments of the present invention can avoid the use of tremendous amounts of expensive and bulky W-band mmW hardware, while at the same time producing accurate results using COTS, low cost 35 GHz frequency photodiodes (in contrast to 110 GHz DETs, which are not currently commercially available).

Figure 8:
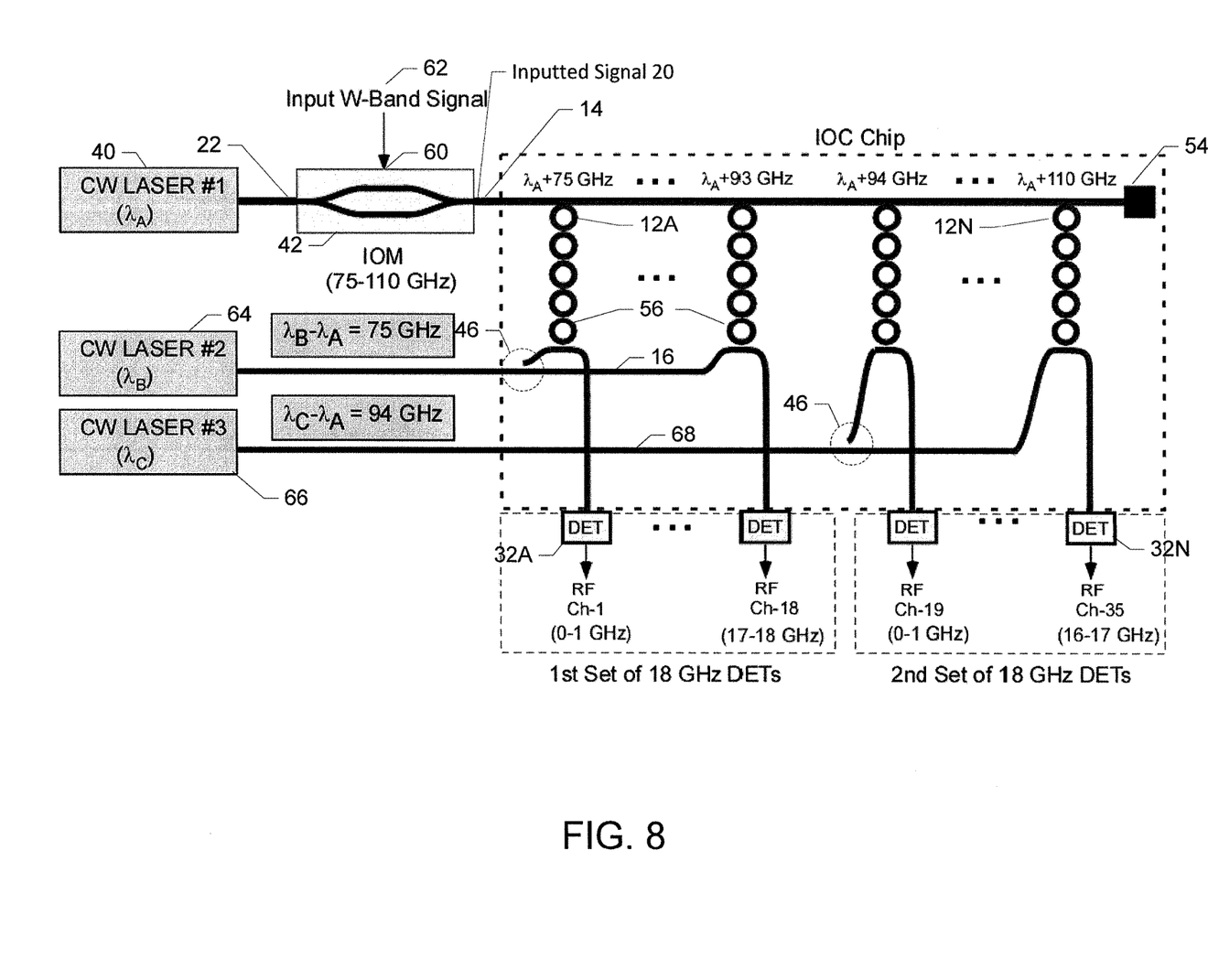
FIG. 8 illustrates a schematic diagram of an example optical channelizer using multiple control waveguides, in accordance with some example embodiments.

The concept described in FIGS. 6 and 7 can additionally be modified to introduce additional control waveguides, in situations where it is desirable to downconvert the W-band to lower-than-Ka RF bands. Turning now to FIG. 8, a schematic diagram of an example optical channelizer is illustrated that uses multiple control waveguides. In the example shown in FIG. 8, two control waveguides 16 and 68 are used, such that the W-band is downconverted into 2 sets of Ku band (18 GHz) outputs. In this example, the laser light 64 at wavelength $\lambda_B$ satisfies $f_{\lambda B}-f_{\lambda A}=75$ GHz, whereas a second laser light 66 at new wavelength $\lambda_C$ satisfies $f_{\lambda C}-f_{\lambda A}=94$ GHz. As FIG. 8 shows, wavelength $\lambda_B$ is transmitted along a first control waveguide 16 and is used by the first 18 channels to downconvert the 75-93 GHz part of the W-band to the 0-18 GHz Ku band. Note that the control waveguide 16 with wavelength $\lambda_B$ terminates at channel #18. Wavelength $\lambda_C$ on the other hand, enters a separate control waveguide 68, mixes with channel #19 (94 GHz) as well as with the remaining channels beyond #19, and terminates at channel #35 (110 GHz). Because its relationship with wavelength $\lambda_A$ is $f_{\lambda C}-f_{\lambda A}=94$ GHz, it downconverts channel #19 into the 0-1 GHz part of the Ku band, channel #20 into the 1-2 GHz band, and so forth, with the last channel (#35) being converted to the 15-16 GHz band. In this fashion, the example shown in FIG. 8 illustrates the use of two sets of 18 GHz photodiodes to cover the full W-band. Accordingly, downconverting W-band signals into the Ku band can expand upon the benefit of using low cost COTS photodiodes, by enabling the use of photodiodes having lower frequencies than 35 GHz. Although two control waveguides are used in the example shown in FIG. 8 in conjunction with 18 GHz photodiodes, in other embodiments additional waveguides may be used to downconvert the W-band signals further, which may enable the use of photodiodes having yet lower frequencies.

Figure 9:
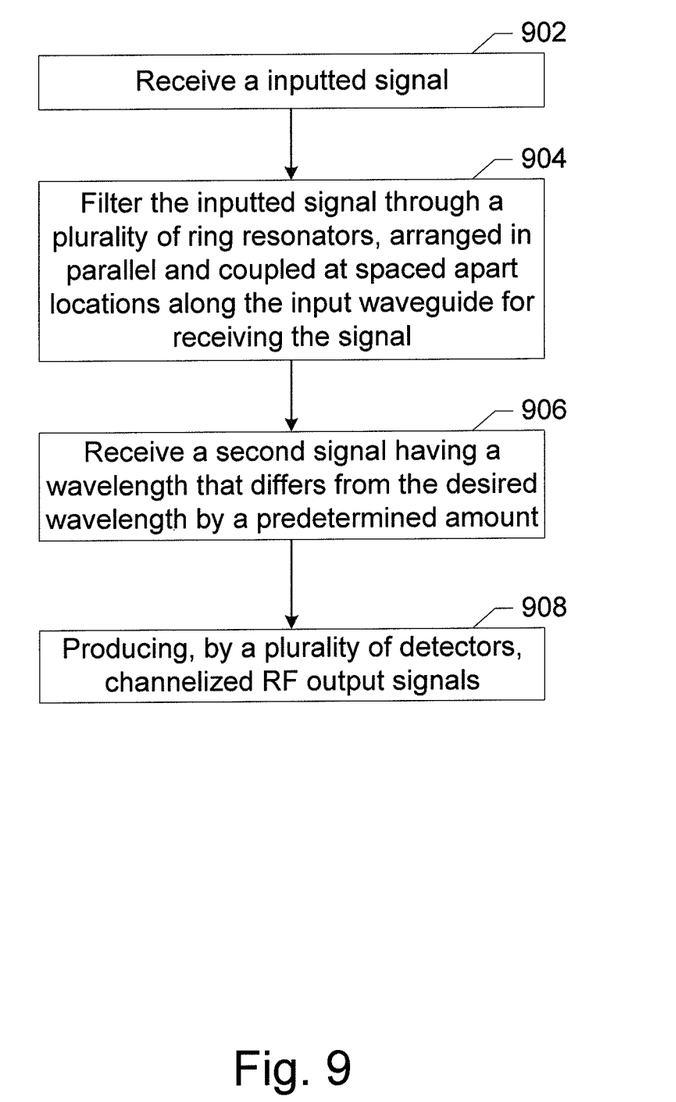
FIG. 9 illustrates a flowchart describing example operations for using an integrated optical channelizer for detecting W-band signals, in accordance with some example embodiments

Turning now to FIG. 9, operations performed by the above-described IOC will be described in connection with the illustrated flowchart of operations for detecting W-band signals.

In operation 902, the IOC includes means, such as, input waveguide 14 of FIG. 5, 6, or 8, for receiving an inputted signal having a plurality of wavelengths including a desired wavelength. As described above, this inputted signal may be received via IOM 42 of FIG. 5, 6, or 8, which is configured to modulate CW light 40 of FIG. 5, 6, or 8, and an input RF signal 58 of FIG. 5, which may further comprise a W-band RF signal 62, shown in FIGS. 6 and 8.

In operation 904, the IOC includes means, such as the plurality of ring resonators 12 of FIG. 5, 6, or 8, for filtering the inputted signal to pass selected wavelength signals to an output end. In this regard, as described previously, each ring resonator blocks the lower sideband as well as the unmodulated optical carrier (or DC light), and accordingly passes only a portion of the upper sideband to an output end 56 of the ring resonator 12 shown in FIGS. 5, 6, and 8. In one such embodiment, the plurality of ring resonators 12 comprise MRRs. In another embodiment, each of the parallel ring resonators includes a plurality of rings, to further increase the filter selectivity of the ring resonator.

In operation 906, the IOC includes means, such as a control waveguide 16 of FIG. 6 or 8, for receiving a second signal having a wavelength that differs from the desired wavelength by a predetermined amount. In this regard, the predetermined amount may be 75 GHz, but may be determined based on the downconversion desired and the number of detectors included in the IOC. Moreover, in embodiments of the IOC including a plurality of control waveguides, this operation may include receiving, by one or more additional control waveguides (e.g., 16 and 68 of FIG. 8), one or more signals having wavelengths that differ from the desired wavelength by predetermined amounts, Finally, in operation 908, the IOC includes means, such as the plurality of detectors 32, shown in FIGS. 5, 6, and 8, for producing channelized RF output signals representative of desired RF bands. In this regard, each of the plurality of detectors is coupled to the control waveguide 16 and produces channelized RF output signals representative of desired RF bands by heterodyning the second signal with a wavelength signal from a respective output end 56 of one of the ring resonators, as shown in FIGS. 5, 6, and 8. In embodiments of the IOC including a plurality of waveguides, each of the plurality of detectors is coupled to one of the control waveguides, and produces channelized RF output signals by heterodyning the signal from the control waveguide to which it is coupled with the wavelength signal from a respective output end 56 of one of the ring resonators.

The above description illustrates the use of multiple optical wavelengths in conjunction with a modified IOC architecture in order to detect and down convert W-band into Ka, Ku, or even lower bands. As a result, embodiments of the present invention avoid the need to use tremendous amounts of expensive and bulky W-band mmW hardware while at the same time using COTS, low cost 35 GHz, 18 GHz or lower frequency photodiodes (in contrast to 110 GHz DETs, which are not currently commercially available).

As described above, FIG. 9 illustrates a flowchart of the operation of the above-described IOC according to example embodiments of the invention. It will be understood that in some embodiments, certain ones of the operations above may be modified or further amplified. Furthermore, in some embodiments, additional optional operations may be included. Modifications, amplifications, or additions to the operations above may be performed in any order and in any combination.

In this respect, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A signal channelizer comprising:
   an input waveguide configured to carry an inputted signal having a plurality of wavelengths including a desired wavelength, wherein
      the inputted signal comprises inputted RF signals modulated onto a single carrier signal, and
      the desired wavelength is a wavelength of the single carrier signal;
   a plurality of ring resonators arranged in parallel and coupled at spaced apart locations along the input waveguide for receiving the inputted signal, wherein each of the plurality of ring resonators is configured to pass a selected wavelength signal to a respective output end;
   two control waveguides configured to carry signals having wavelengths that differ from the desired wavelength by a first predetermined amount and a second predetermined amount respectively, wherein
      the first predetermined amount is different from the second predetermined amount, and
      the desired wavelength is the wavelength of the single carrier signal; and
   a plurality of detectors, wherein each of the plurality of detectors is coupled to a respective output end of one of the ring resonators and to one of the two control waveguides, wherein
      the two control waveguides are coupled to distinct subsets of the plurality of detectors,
      the plurality of detectors configured to produce channelized RF output signals representative of desired RF bands, and
      the frequency range of the channelized RF output signals is smaller than the frequency range of the inputted RF signals.

2. The signal channelizer of claim 1, wherein each of the plurality of detectors is configured to produce a channelized RF output signal by heterodyning the signal from the control waveguide to which it is coupled with the selected wavelength signal from a respective output end of one of the ring resonators.

3. The signal channelizer of claim 1, further comprising:
   one or more additional control waveguides that carry signals having wavelengths that differ from the desired wavelength by predetermined amounts;
   wherein at least one of the plurality of detectors is coupled to each of the one or more additional control waveguides and is configured to produce a channelized RF output signal by heterodyning the signal from the control waveguide to which it is coupled with the selected wavelength signal from a respective output end of one of the ring resonators.

4. The signal channelizer of claim 1, wherein the inputted RF signals comprise a W-band signal.

5. The signal channelizer of claim 4, wherein the first and second predetermined amounts comprise at least 75 GHz.

6. The signal channelizer of claim 1, wherein at least one of the ring resonators includes a plurality of rings.

7. The signal channelizer of claim 1, wherein the ring resonators comprise micro ring resonators.

8. The signal channelizer of claim 1, further comprising an optical modulator configured to create the inputted signal for the input waveguide by modulating an inputted optical carrier signal with a received signal.

9. The signal channelizer of claim 1, wherein the signal channelizer is contained on a single chip.

10. The signal channelizer of claim 1, wherein the control waveguides are configured to receive the signals from at least a source distinct from the input waveguide.

* * * * *